March 5, 1963   J. J. ZICCARDI   3,079,973
TRACTION DEVICES FOR AUTOMOTIVE VEHICLE WHEELS
Filed Oct. 18, 1961   4 Sheets-Sheet 1

INVENTOR.
John J. Ziccardi
BY William B Jaspert
Attorney

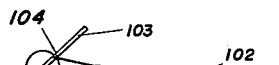
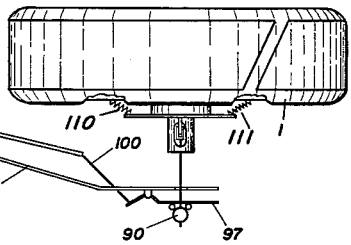
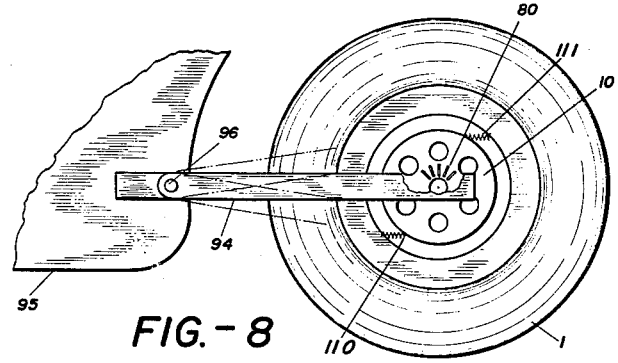
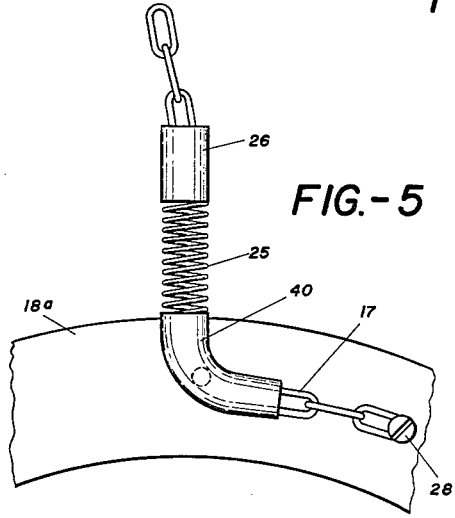
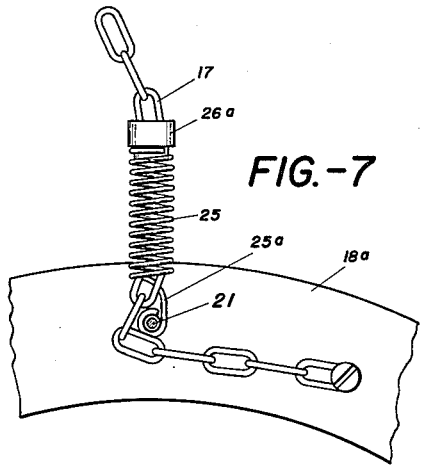
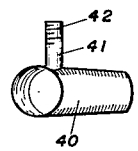

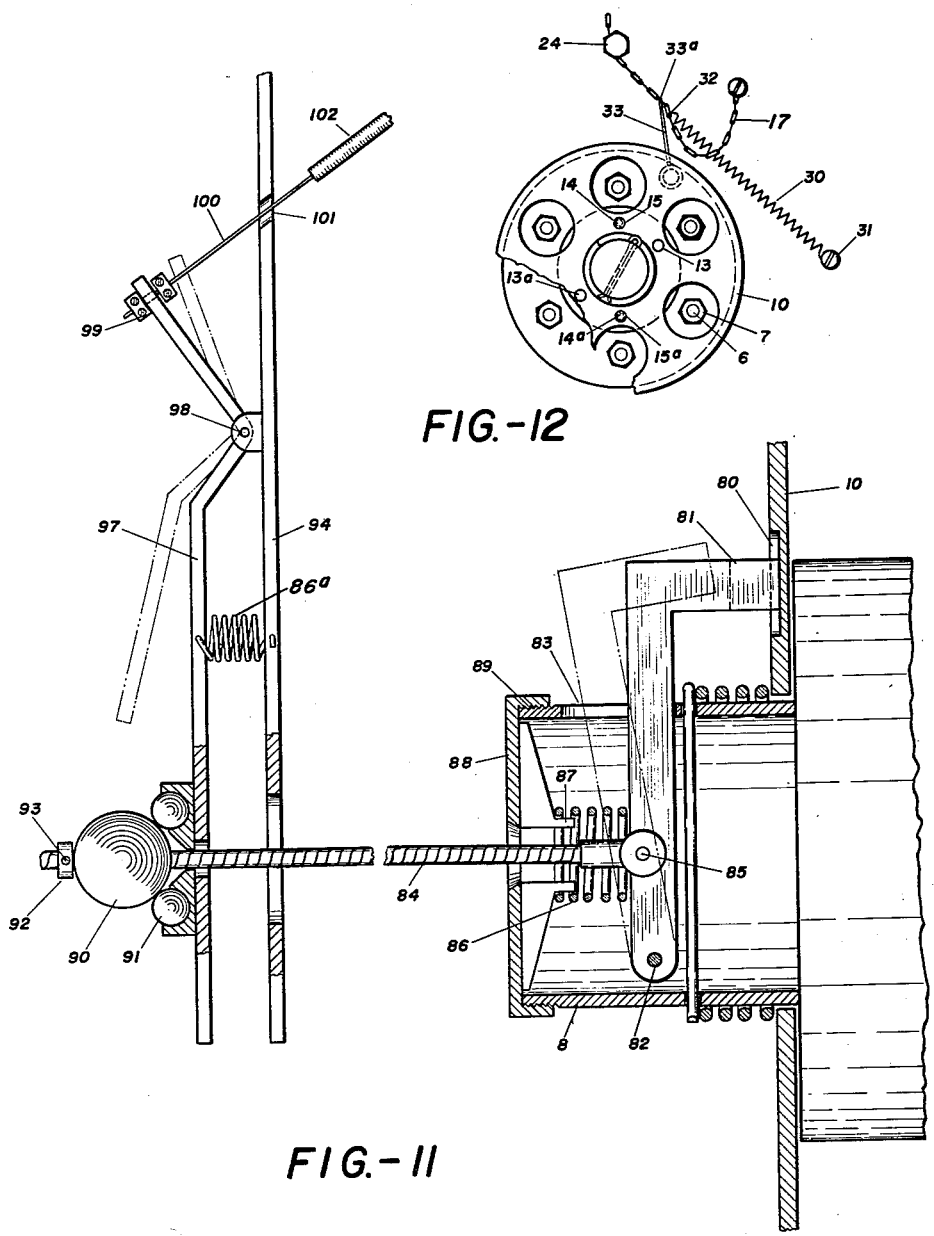

United States Patent Office 3,079,973
Patented Mar. 5, 1963

3,079,973
TRACTION DEVICES FOR AUTOMOTIVE
VEHICLE WHEELS
John J. Ziccardi, Evans City, Pa., assignor of fifty percent
to William B. Jaspert, Pittsburgh, Pa.
Filed Oct. 18, 1961, Ser. No. 148,011
11 Claims. (Cl. 152—216)

This invention relates to new and useful improvements in traction devices for the wheels of automotive vehicles, and it is among the objects thereof to provide a traction device for permanently mounting on the wheels of automotive vehicles during the winter in a non-operative position to be available for traction by a simple adjustment of the traction member mount with which it is connected.

It is a further object of the invention to provide a traction device which is adapted for use with heavy tread tires such as snow treads by providing recesses in the tread for storing the traction members when in their inoperative position and which will release the traction members for use upon the outer periphery of the treads when in their operative position.

It is still a further object of the invention to provide a traction device for automotive vehicle wheels which is mounted on the wheel to be moved into and out of operative position by actuating a control on the outboard side of the wheel.

Another object of the invention is the provision of traction chains held under tension in a storage recess in the periphery or tread of a tire, which chains are secured at their ends to form loops of a size to fall out of the storage recess and which are held under tension to hold them in said recess until overcome by centrifugal force to which the chain is subjected when the wheel is rotated.

A further object of the invention is the provision of a control for lengthening and shortening the traction chains to render them operative and inoperative as desired.

Still another object of the invention is the provision of a traction device for automotive vehicle wheels of the above-designated character is which the control for adjusting the traction members to operative and inoperative positions is actuated from within the vehicle by the operator.

It is still another object of the invention to provide a store-away type of traction device which is rendered operative by centrifugal force acting thereon and which is provided with guide means for automatically positioning the traction device to be retracted to its stored position.

These and other objects of the invention will become more apparent from a consideration of the accompanying drawings constituting a part hereof in which like reference characters designate like parts and in which:

FIGURE 5 is a side elevation of a modified form of chain positioner;

Figure 3:
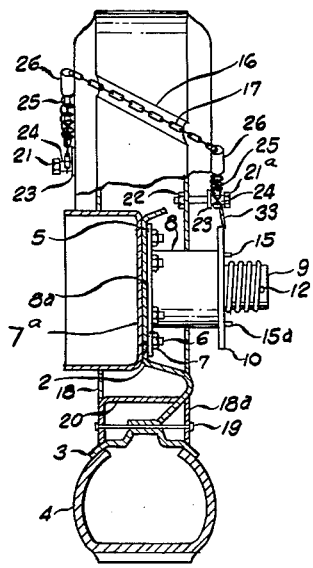
FIGURE 3 is a cross-sectional view, partially in elevation, of the wheel shown in FIGURES 1 and 2.
Figure 1:
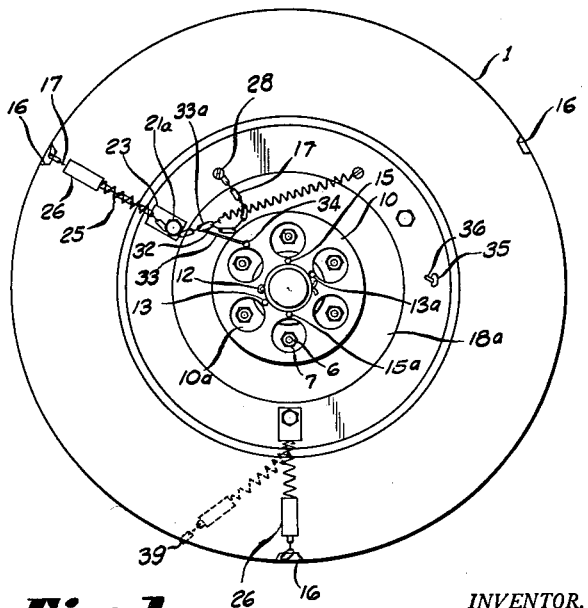
FIGURE 1 is a side elevational view of the outboard side of an automotive vehicle wheel with traction devices embodying the principles of this invention.
Figure 13:
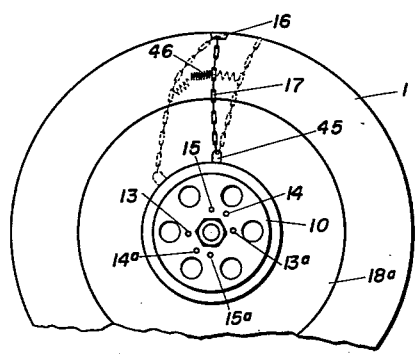
Figure 14:
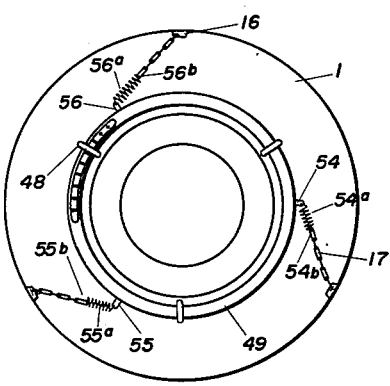
Figure 15:
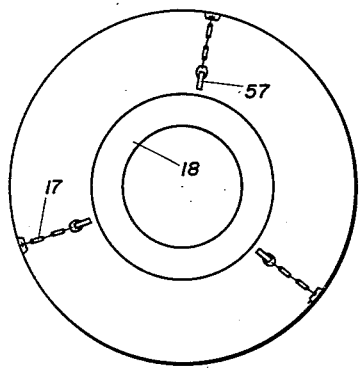
Figures 16, 17:
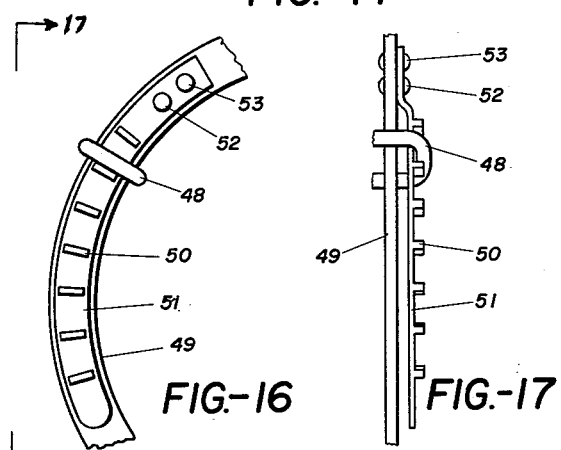
Figure 18:
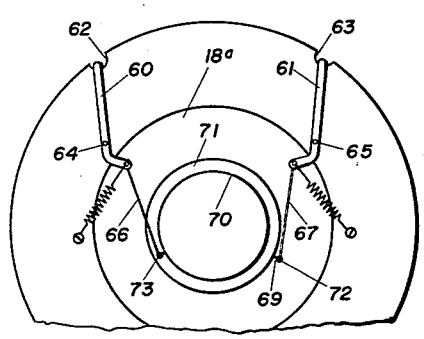
Figure 19:
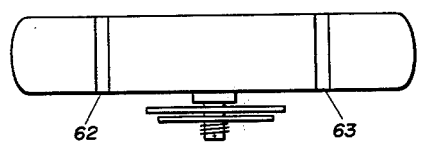
Figure 20:
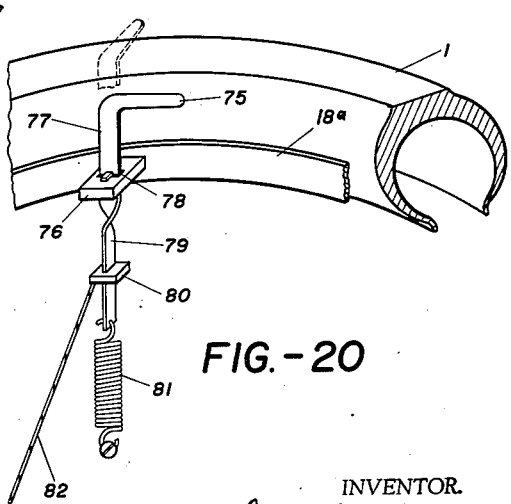

FIGURE 6 a view in perspective of the chain positioner guide;

FIGURE 7 a side elevational view of a modified form of chain positioner;

FIGURE 8 a side elevational view of a rear vehicle wheel with a portion of a chain positioner support connected to the vehicle body;

FIGURE 9 a top plan view, partially in cross section, of the wheel and vehicle body of FIGURE 8 and operating linkage leading to the interior of the vehicle on which the wheel is mounted;

FIGURE 10 a side elevational view of an operating lever and ratchet support;

FIGURE 11 a cross section, partially in elevation, of a control mechanism for setting the traction device operator to its operative or inoperative position;

FIGURE 12 an enlarged view in side elevation of the chain locking disc shown in FIGURES 1 and 3;

FIGURE 13 a side elevation, partially broken away, of a wheel with a storable traction device having a modified form of chain positioner;

FIGURE 14 a side elevation of the outboard side of a wheel diagrammatically illustrating a modified form of control for positioning the traction chains;

FIGURE 15 a similar view of the inboard side of the wheel of FIGURE 14;

FIGURE 16 a side elevation of a portion of the outboard side of a wheel having a modified form of adjusting device for setting the chains to operative and inoperative position;

FIGURE 17 an end view taken on the line 17—17, FIGURE 16;

FIGURE 18 a side elevation of a portion of a wheel having a modified form of traction device;

FIGURE 19 a top plan view of the wheel shown in FIGURE 18; and,

FIGURE 20 a side elevation of a portion of a wheel with still another modified form of traction device.

With reference to FIGURES 1 through 7 of the drawings, the numeral 1 generally designates a vehicle wheel which, as shown in FIGURE 3, consists of a disc 2 and rim 3 on which the pneumatic tire 4 is mounted. The hub portion 5 of the wheel 1 is shown to have bolts 6 protruding from the axle flange 7a to which the wheel 1 is secured by the nuts 7.

Secured to the outboard face of the hub 5 is a hub extension 8 having a flange 8a and spindle 9 extending therefrom. The flange 8a is provided with holes for the hub bolts 6. A circular disc 10 rests against the extension 8 and is urged in position by a coil spring 11 that is secured by a cotter key 12 in the spindle 9. The disc 10 is provided with four holes more clearly shown in FIGURE 12, for receiving pins that extend from hub extension 8, the holes being designated by the numerals 13, 13a and 14, 14a, and the pins by the numerals 15 and 15a. The disc 10 can be retracted against tension of spring 11 to disengage the pins and rotated so that the holes of the disc, of which there are four, can be aligned with the pins, of which there are two, and then snapped back into position by the coil spring 11. Disc 10 has holes 10a to make the bolts and nuts 6 and 7 accessible. By thus rotating the disc 10 through an angle of less than a quarter of a turn, the disc 10 will function to lengthen or shorten the traction chains in a manner hereinafter described.

As will be seen in the several views, the wheel 1 is provided with recesses or grooves 16 which are disposed at an angle, as shown in FIGURE 3, to avoid thumping the wheel which might result if the groove or recess 16 were disposed straight across the face of the tire. A traction chain 17 extends lengthwise of the recess 16 and is mounted on the wheel in the following manner:

A pair of rings 18 and 18a are secured to the wheel by means of bolts 19 that extend through slots provided between the rim 3 of the wheel 1 and the disc 2, FIGURE 3. The ring 18 is provided with a flange 20 that acts as a spacer. The ring 18 may be designated the inboard ring and the ring 18a the outboard ring. Mounted on the rings 18 and 18a are bolts 21 and 21a and mounted on these bolts are what may be termed automatic chain positioners which consist of plates 23 that are mounted on the bolts against spacing sleeves 24 connected by the bolts. Secured to the plate 23 is a coil spring 25 which, at its other end, is secured to a tube 26. A sleeve 24 is disposed between the heads of the bolts 21 and 21a and the plates 23 which sleeves abut against the plates 23 and locks them in position when the bolts are drawn tight. The plate 23 is therefore fixed and the tube 26 can be displaced only against the tension of the spring 25 so that it will always return to the same position when no tension is applied to the chain 17. The chain 17, the plate 23, the coil spring 25 and the tube 26 are more clearly shown in the enlarged view of FIGURE 4, as is also the spacer sleeve 24. Bolts 21 and 21a are fastened to rings 18 and 18a by nuts 22, as shown in FIGURE 3.

Figure 2:
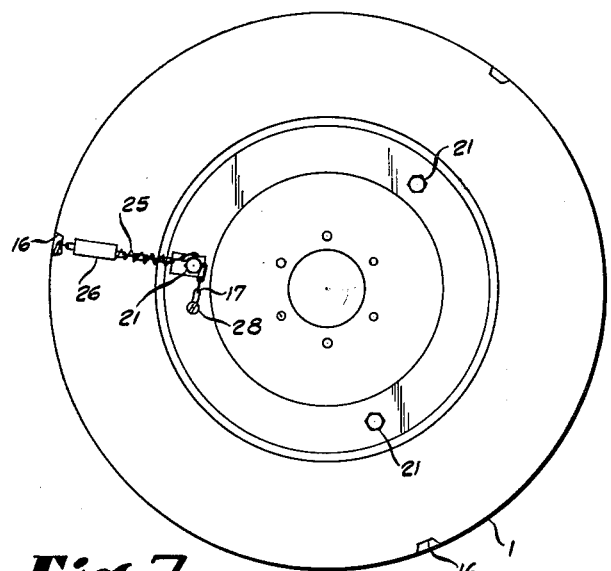
FIGURE 2 is an elevation of the inboard side of the vehicle wheel shown in FIGURE 1.

Again referring to FIGURE 1, the traction chain 17 is fastened to the ring 18a by an anchor bolt 28 on the outside and by a similar anchor bolt on the inside, FIGURE 2, the mounting of the chain on the inboard side on ring 18 being the same as that described in connection with the mounting of the chain on ring 18a. It is to be noted that the bolts 21 and 21a are angularly spaced on opposite sides of the wheel to make up for the diagonal disposition of the recess or groove 16. A long tension spring 30, secured by screw 31 to the ring 18a, is fastened to the chain 17, as shown at 32, FIGURES 1 and 12. This normally maintains the chain 17 in a taut position. Chain 17 is further fastened to a flexible cable 33 at 33a that is secured at 34 to the disc 10. As shown in FIGURE 1, there are three grooves 16 and therefore three sets of traction devices and the chains 17 of all of them are similarly connected by a flexible cable 33 or a rigid lever to the disc 10. The numeral 35 designates an opening for the tire valve stem 36. The operation of the traction device as described in connection with FIGURES 1 through 4 and 12 is briefly as follows:

When the locking disc 10 is set to inoperative position of the traction chains with holes 14 and 14a over pins 15 and 15a, as shown in FIGURE 12, the flexible cable or lever arm 33 will hold the chain taut in the groove or recess 16. By pulling the disc 10 out of the pins 15 and 15a and rotating it counterclockwise to align the holes 13 and 13a with the pins 15 and 15a and mounting disc 10 in this position, the connecting cable or lever 33 will release the chains 17 so that they can raise out of the recesses 16 and crawl on the tread of the tire, as shown at 39, FIGURE 1 of the drawing. The centrifugal force overcomes the tension of spring 30 and causes the chain to escape from the recess and supply traction to the wheel.

Figure 4:
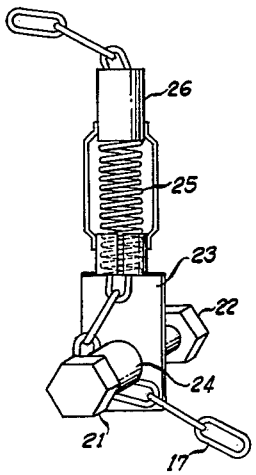
FIGURE 4 is an enlarged detail in elevation of an automatic chain positioner constituting a part of the traction device.

When disc 10 is again pulled away from the pins and rotated clockwise to register the holes 14 and 14a with the pins 15 and 15a, the chains will be held in the recesses 16 and do not respond to centrifugal force when the wheel begins to rotate. Thus it is seen that by changing the position of disc 10 to pull or release the traction chains 17, they become operative through centrifugal action to ride on the tread of the tire or be retained in the recesses. As shown in FIGURE 4, the chain 17 is guided around the sleeve 24 and is free to slide thereover. When the traction force acting on the chain is released, the automatic chain positioner will restore the chain to the position where it will be in alignment with the recess 16 to allow it to slip into the recess by tension of spring 30 when the disc 10 is moved to inoperative position.

In FIGURES 5, 6 and 7 is shown a modified form of chain positioner, the one in FIGURES 5 and 6 being an L 40 having a stud bolt 41 with a thread 42 for fastening to the ring 18a. The coil spring 25 is secured to the L 40 and the guide tube 26 is secured to the spring 25 as by brazing.

In FIGURE 7, the coil spring 25 is provided with a shank 25a which is provided with an eyelet 25b for engaging bolt 21 on which it is fastened against turning by spacing sleeves 24. This eliminates the plate 23 of FIGURES 1 to 4 of the drawing. Also, instead of a tube 26, a shorter ferrule 26a may be employed. It is understood that the shank portion 25a of the spring 25 will not be subjected to angular movement so that the tension of the spring 25 acts to restore or position the chain to alignment with the recesses 16 when centrifugal force is ineffective on the chains.

In the form of the device shown in FIGURE 13, the chain 17 is mounted for storing in the groove 16 in the same manner as shown in connection with FIGURES 1 through 4. However, the end of the chain on the outboard side is fastened to an eyelet 45 that is on the ring 18a. The disc 10 functions in the same manner to lengthen and shorten the chain 17 by moving it to register the holes 14 and 14a or 13 and 13a with the pins 15 and 15a. The tension spring is eliminated and in place of the tension spring there is a coil spring or other suitable kind of spring 46 that is fastened to a link in the chain, as shown, and to the ring 18a. The spring 46 has the dual function of maintaining tension on the chain 17 and also to automatically restore the traction chain in alignment with the storage grooves 16 in the tread of the tire.

In the form of the device shown in FIGURES 14, 15, 16 and 17, a cleat 48 of metal may be molded into the body of the tire 1. Disposed within these cleats or eyelets, which are U-shaped, as shown in FIGURE 17, is a slide ring 49 having protuberances or teeth 50, on a spring plate 51 which is riveted to the ring 49 at 52 and 53. By depressing the free end of the member 51, the teeth 50 disengage the cleats or eyelets 48 and the ring is angularly movable. The chains 17 are fastened to the ring 49 at 54, 55 and 56, FIGURE 14, and resilient elements such as rubber rings 54a, 55a and 56a are attached to the chains at 54b, 55b and 56b at one end and to the ring 49 at their other end. The resilient members 54a, 55a and 56a act both as a means for maintaining the chains taut at all times and for automatically restoring the chains to their storing position in alignment with the recesses 16.

It will be noted in FIGURE 15 that the inboard side of the wheels do not have a ring like the member 49 and the chains are fastened to eyelets 57 molded in the tire itself or connected to the ring 18a. In the modification shown in FIGURE 18, a pair of stirrup-like members 60 and 61 extend across the tire and normally seat in recesses 62 and 63. They are hinged at 64 and 65 to pivot members that may be either molded in the tire body or mounted on the rings 18a. A plurality of locking discs 70 and 71 are mounted, as shown in FIGURE 18, the disc 71 having a post 72 and the disc 70 a post 73 to which the links 66 and 67 are attached, as shown. By rotating the discs 70 and 71, the tension on the cables 66 and 67 is released to permit the cross member to escape from the recesses and lay on the tire to provide traction. In another modification shown in FIGURE 20, a traction member in the shape of a cross bar 75 is mounted in a steel guide block 76 attached to the outboard ring 18a. The bar 75 is provided with a shank 77 that is a flat member of flexible material movable in a slot 78 of the block 76. One portion of the shank designated by the numeral 79 is twisted to be at right angles to the portion above the block 78. The lower end of the shank passes through a stop block 80 and the shank 79 is held by a coil spring 81 secured to the hub of the wheel. A locking cable 82 is connected to the locking disc 10, not shown, and by rotating the disc to locking or unlocking position, as in FIGURE 1, the traction device is subjected to centrifugal action to raise and lower it in relation to the periphery of the tire 1. As the traction member raises due to centrifugal force, it will automatically rotate on its shank portion 90° to place the cross member across the tread surface of the tire and when the locking disc is set to lock position, the cable 82 will draw the shank 79 downward and cause the cross bar 75 to rotate 90° to the position where the arm will rest against the side of the tire, as shown in FIGURE 20.

The above-described mechanism that employs the locking disc 10 can be used with a control that may be mounted on the dash or other part of an automobile accessible to the operator, this control being shown in connection with FIGURES 8 to 11 of the drawing.

Referring to FIGURE 11, the numeral 10 designates the disc corresponding to the disc 10 of FIGURE 1. This disc is provided with teeth 80, also shown in FIGURE 8, which are engaged by a pawl 81, FIGURE 11, that is pivoted at 82 to the hub extension 8, the pawl 81 extending through a slot 83 within which it is movable by a flexible cable 84 to engage and disengage the teeth 80. The cable 84 is connected to the pawl 81 by a pivotal connection 85. The pawl 81 is movable against a coil spring 86 which seats in a spindle 87 attached to a screw cap 88 having threaded connection at 89 with extension 8. The end of the cable 84 is provided with a ball 90 that rests on a ball bearing 91 to eliminate friction, the spacing of the ball 90 from the pivot 85 being controlled by a collar 92 secured by a set screw 93. The numeral 94 designates an arm more clearly shown in FIGURE 8, which is secured to the vehicle body such as the fender 95, by a pivot 96 so that the arm is free to ride up and down with the wheel 1. Mounted on the arm 94 is a lever 97 pivoted at 98 and secured by a clamp 99 to a control wire 100 that passes through a slot 101 in the arm 94. As shown in FIGURE 9, the wire extends through a hollow cable 102 to a lever 103 to which it is fastened at 104, as shown in FIGURE 9. The lever is provided with a pawl and ratchet mechanism, FIGURE 10, generally designated by the numeral 105 having a lever 106 which, when depressed, releases the pawl from the notches 107 and 108 provided in the segment 109 which may be mounted on the dash or the floor of the vehicle.

By pulling lever 103 forward, tension on the wire 100 will draw the lever 97 down on one side of the pivot 98 causing it to raise on the other side against the tension of spring 86 and another coil spring 86a. This lifts the pawl 81 free of the teeth 80 and permits the control disc 10 to rotate in the direction to release the tension on the traction chains 17 and allow them to escape from the recesses 16 of the tire to the operative position on the periphery of the wheel. The centrifugal action on the traction chains 17 will pull on the disc 10 and overcomes tension of the disc return springs 110 and 111, FIGURES 8 and 9 to permit it to rotate through an angle sufficient to release the chains.

In operation, the vehicle operator merely pulls the lever 97 to release the traction chains 17 from their inoperative position and by returning the lever to its initial position, the traction chains 17 are rendered inoperative and held in their recesses 16.

Although three chains or other traction members have been shown, it is evident that more or less can be used on a vehicle wheel, but three have been found sufficient to supply traction where that is needed. By means of the above-described traction device, the chains can be rendered operative in slippery places such as when the vehicle is on a steep driveway leading to or from a garage and can be again rendered inoperative when it reaches the level road where sufficient traction is available.

It is evident from the foregoing description of this invention that in all forms of the devices herein shown they are rendered operative by a control for releasing the traction device to be acted upon by centrifugal force and a guide element for automatically returning them to storage position when relieved of centrifugal force.

Although several embodiments of the invention have been herein illustrated and described, it will be evident to those skilled in the art that various modifications may be made in the details of construction without departing from the principles herein set forth.

I claim:

1. A traction device for automotive vehicles comprising in combination with a wheel, a plurality of angularly spaced surface gripping members extending across the tread of the wheel, said member being secured to a fixed member on one side of said wheel and to a movable common locking member on the other side of the wheel, a recess in the wheel tread for receiving and storing said gripping member, tension means for holding said member in said recess and means operative in response to centrifugal force acting upon said gripping members for releasing said gripping members from said recess to their operative position.

2. A traction device as set forth in claim 1 in which the gripping member is provided with guide means for aligning the same with the recess when acted upon by said tension means.

3. A traction device as set forth in claim 1 in which the gripping member is provided with guide ways through which the gripping member passes and means for normally biasing said guide ways to align said gripping member with said storage recess.

4. A traction device as set forth in claim 1 in which the locking member has an operative and inoperative position which, in the operative position, releases the gripping member to permit its escape from the storage recess and in its inoperative position retracts the gripping member to its stored position in said recess.

5. A traction device as set forth in claim 4 in which said locking member is set to its operative and inoperative positions by control mechanism operative from within the vehicle.

6. In a traction device for automotive vehicles a wheel having a gripping member extending across the tread of the wheel, said gripping member being secured to a movable member for adjusting the same to a loose and taut position on the tread, said wheel having a recess for storing the gripping member in the taut position thereof below the normal gripping surface of the wheel, guide means for aligning said gripping member with said recess when the movable member moves to the taut position and means for fastening said gripping member independently of said movable member, said movable member being angularly movable relative to said guide means.

7. A traction device as set forth in claim 6 in which the movable member is a ring mounted on a shaft on which it is rotatable through an angle, said movable member having locking means for holding the same in the loose or taut position of the gripping member.

8. A traction device as set forth in claim 6 in which the guide means is normally biased by a spring for maintaining the gripping member in alignment with its storage position on the wheel.

9. A traction device as set forth in claim 6 in which the movable member has a plurality of protuberances extending therefrom for interacting with a cleat to hold it in its angularly adjusted positions.

10. A traction device as set forth in claim 6 in which the guide means constitutes a spring connected at one end to said gripping member and having its other end connected to the side of the wheel.

11. A traction device as set forth in claim 6 in which the movable member has a plurality of angularly spaced teeth, a pawl mounted on the hub of the wheel for engaging the teeth of the movable member, means for releasing said pawl to permit the movable member to assume an adjusted position to thereby render the gripping member operative and inoperative and means for retracting said pawl consisting of a link and lever operative while said vehicle is in motion, with means for actuating said lever to retract the pawl from engagement with the teeth of the movable member and means for actuating said lever.

References Cited in the file of this patent

UNITED STATES PATENTS

| | | |
|---|---|---|
| 2,537,231 | Necrason | Jan. 9, 1951 |
| 2,913,033 | Sharpe | Nov. 17, 1959 |